(No Model.)
C. HERSCHER.
DISINFECTING APPARATUS.
No. 548,545. Patented Oct. 22, 1895.
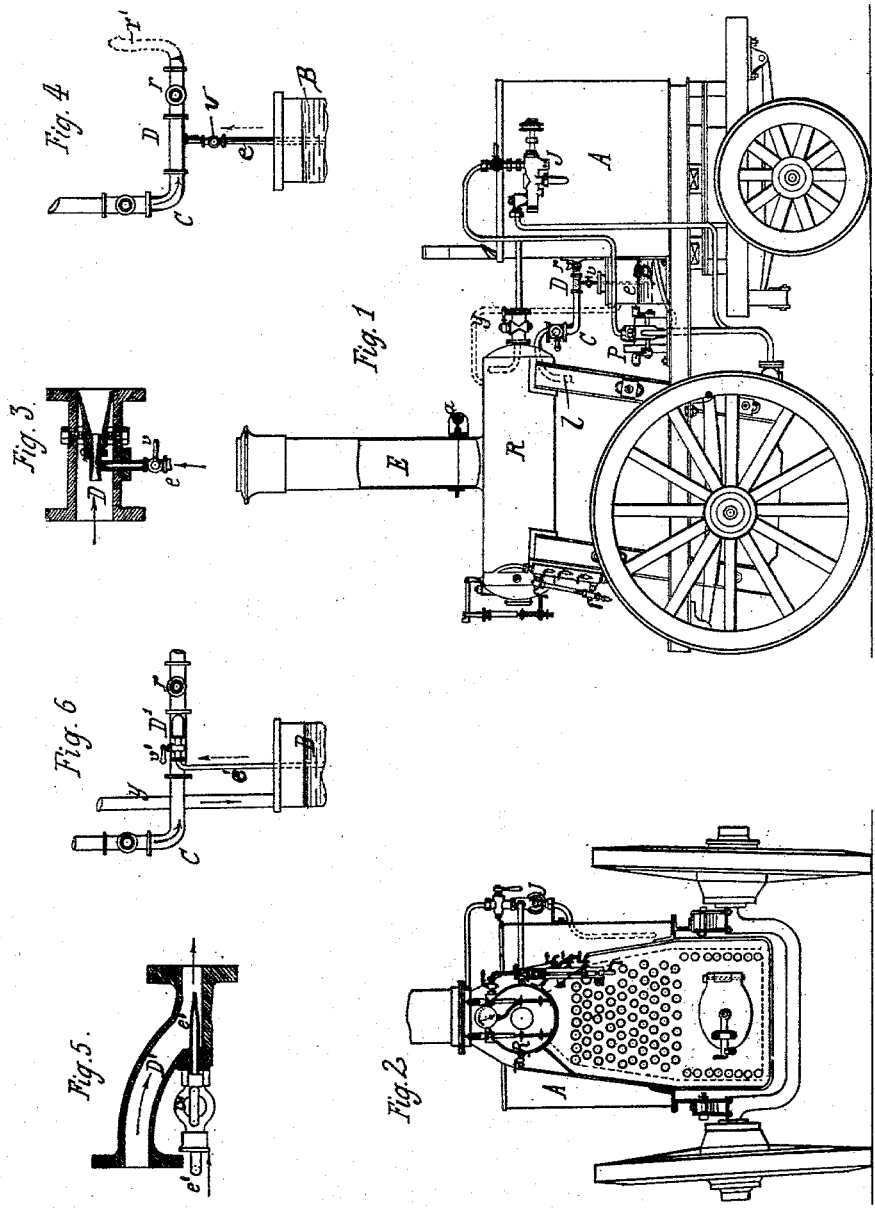
WITNESSES
George Baumann
James Gracie
INVENTOR
Charles Herscher
By his Attorneys
Howson and Howson

UNITED STATES PATENT OFFICE.

CHARLES HERSCHER, OF PARIS, FRANCE.

DISINFECTING APPARATUS.

SPECIFICATION forming part of Letters Patent No. 548,545, dated October 22, 1895.

Application filed November 23, 1892. Serial No. 452,935. (No model.) Patented in France April 17, 1889, No. 197,551; in Belgium April 20, 1889, No. 85,917; in Italy September 30, 1890, No. 28,074, and in Austria-Hungary January 25, 1891, No. 36,996.

*To all whom it may concern:*

Be it known that I, CHARLES HERSCHER, (of the firm of Geneste, Herscher & Co.,) a citizen of the Republic of France, residing at Paris, in the Republic of France, have invented certain new and useful Improvements in Disinfecting or Cleaning Apparatus, (for which I have obtained Letters Patent in France, No. 197,551, dated April 17, 1889; in Belgium, No. 85,917, dated April 20, 1889; in Italy, No. 28,074, dated September 30, 1890, and in Austria-Hungary, No. 36,996, dated January 25, 1891,) of which the following is a specification.

This invention has for its object a means of simultaneously cleansing and disinfecting in a rapid, reliable, and economical manner walls which are contaminated or soiled with viscous or adhesive deposits, such as are noticeable in cattle-trucks, stables, cowsheds, &c.

It consists in a device for the simultaneous projection of a jet of boiling water under steam-pressure and of an antiseptic solution. The simultaneous projection of these two agents is obtained by means of a special projecting apparatus, the whole forming, with a steam-boiler, a light and compact apparatus capable of being rapidly set in action. This apparatus is intended for simultaneously disinfecting and cleansing and is shown on the accompanying drawings.

Figure 1 is a side view of the apparatus. Fig. 2 is an end view of the same. Figs. 3, 4, 5, and 6 are views of details hereinafter described.

The apparatus comprises a boiler fixed on a four-wheeled carriage with suspension-springs, which also support a water-reservoir A and a vessel B containing an antiseptic solution. The water from the reservoir A is for feeding the boiler, which may be done either by means of an injector J or by means of a steam-pump P. The boiler and the reservoir A are so arranged that the boiler may be filled with water before commencing to use it by filling the reservoir A with water. The boiler is a rapidly-heating one with a steam-reservoir R. It is provided with the accessory fittings, such as valves, manometers, water-gage glasses, gage-taps, cleaning-plugs, &c. The chimney E is provided with a strong hinge $a$, so that it can be lowered. A blower allows of the draft being increased.

Inside the boiler a curved tube $l$ is attached to the steam-reservoir, and its lower extremity below the water-line terminates at some distance above the level of the upper tubes or of the roof of the furnace. This tube is in connection with an external tap from which runs a tube C, ending in a special injector D, which draws the antiseptic liquid from the vessel B by means of a pipe $e$. The tube is extended beyond the injector D and terminates in a tap $r$. An india-rubber or canvas hose-pipe $r'$, (see Fig. 4,) with a nozzle at the end, is fixed on this tap $r$. The injector D employed consists, as shown in detail on a larger scale in Fig. 3, of two or more conical divergent tubes having each a narrower part, and which are fitted one in the other in such a way that one of the widened ends of each tube coincides with the narrower part of the tube inclosing it. Fig. 4 shows this injector D arranged in the length of the tube C and connected with the tube $e$, which has a regulating-tap $v$. The boiling water under pressure passes by the tube C into the suction device, thereby drawing or sucking up the antiseptic liquid, which rises through the tube $e$ and mingles with the boiling water to be projected simultaneously through the nozzle, the flexible tube of which is fixed to the tap $r$.

Instead of an injector D being used for drawing up the antiseptic liquid by the agency of the boiling water this liquid may be forced up into the tube C. For this purpose the tube C instead of being provided with the injector D is provided with an injector D', (shown in detail on a larger scale in Fig. 5,) into which the extremity of the tube $e'$, which is provided with a regulating-tap $v'$, simply opens. The opposite end of this tube dips into the vessel B, as shown in Fig. 6. Further, a tube $y$ (see Fig. 6, and also in dotted lines in Fig. 1) places the vessel B and the steam-reservoir R in communication. Under the action of the pressure which is then exerted in the vessel B the antiseptic liquid rises by the tube $e'$ and flows into the interior of the injector D', where it mingles with the boiling water supplied by the tube C and is then projected simultaneously therewith by the nozzle fixed to the tap $r$.

Whatever way may be made use of the mixture of boiling water and antiseptic liquid is none the less projected with force against the surfaces or articles which are to be disinfected. The apparatus therefore acts simultaneously by its elevated temperature and by its chemical action for disinfecting and cleaning in one operation. The force of the jet at the extremity of the nozzle allows it to penetrate into all the crevices.

I declare that what I claim is—

1. In an apparatus for simultaneously disinfecting and cleansing, the combination of a boiler, and a pipe C leading therefrom below the water line to supply boiling water under boiler pressure, with a vessel B for antiseptic solution, an injector in the said pipe C, and a pipe leading from the said vessel B to the injector to supply the antiseptic fluid to the boiling water coming from the boiler, the said pipe C being extended beyond the injector and provided with a tap $r$ and discharge pipe, substantially as set forth.

2. In an apparatus for simultaneously disinfecting and cleansing, the combination of a boiler, a pipe C leading therefrom and provided with an injector D having divergent cones, with a vessel B, for an antiseptic solution and a pipe $e$ immersed in the solution in the said vessel at one end and connected to the injector D at the other end, all substantially as and for the purposes set forth.

In testimony whereof I have signed my name to this specification in the presence of two subscribing witnesses.

CHARLES HERSCHER.

Witnesses:
 JOSEPH DELAGE,
 ROBT. M. HOOPER.